(12) United States Patent
Goldman et al.

(10) Patent No.: US 9,686,662 B2
(45) Date of Patent: Jun. 20, 2017

(54) WIRELESS HEADSET AND A HEADSET SYSTEM FOR TRANSFERRING CALL BETWEEN TWO TELECOMMUNICATION DEVICES

(71) Applicant: GN Netcom A/S, Ballerup (DK)

(72) Inventors: Tomasz Jerzy Goldman, Hellerup (DK); Stefan Heise, BrØnshØj (DK)

(73) Assignee: GN Netcom A/S (DK)

( * ) Notice: Subject to any disclaimer, the term of this patent is extended or adjusted under 35 U.S.C. 154(b) by 0 days.

(21) Appl. No.: 15/181,149

(22) Filed: Jun. 13, 2016

(65) Prior Publication Data

US 2016/0302049 A1    Oct. 13, 2016

Related U.S. Application Data

(63) Continuation of application No. 14/312,973, filed on Jun. 24, 2014, now abandoned, which is a
(Continued)

(51) Int. Cl.

| | |
|---|---|
| *H04M 3/42* | (2006.01) |
| *H04W 4/16* | (2009.01) |
| *H04M 1/253* | (2006.01) |
| *H04M 1/60* | (2006.01) |
| *H04M 1/725* | (2006.01) |

(Continued)

(52) U.S. Cl.
CPC ........... *H04W 4/16* (2013.01); *H04M 1/2535* (2013.01); *H04M 1/6066* (2013.01); *H04M 1/7253* (2013.01); *H04W 24/04* (2013.01); *H04W 76/023* (2013.01); *H04W 76/027* (2013.01); *H04M 2250/02* (2013.01)

(58) Field of Classification Search
CPC ..... H04W 4/16; H04W 76/023; H04W 24/04; H04W 76/027; H04M 1/7253; H04M 1/2535; H04M 1/6066; H04M 2250/02
See application file for complete search history.

(56) References Cited

U.S. PATENT DOCUMENTS

| | | |
|---|---|---|
| 7,424,288 B2 | 9/2008 | Jung |
| 8,213,920 B2 | 7/2012 | Valdez |

(Continued)

FOREIGN PATENT DOCUMENTS

| | | |
|---|---|---|
| CN | 101039451 | 9/2007 |
| CN | 101242663 | 8/2008 |

OTHER PUBLICATIONS

English translation of Chinese Office Action dated Oct. 8, 2015 for Chinese patent application No. 2012800653115.

*Primary Examiner* — Ajit Patel
(74) *Attorney, Agent, or Firm* — Altera Law Group, LLC (57) ABSTRACT

A wireless headset system comprising a first telecommunication device, a second telecommunication device, such as a mobile phone or a smart phone and a wireless headset adapted to be wirelessly connected by a first radio link to the first telecommunication device. The headset system is adapted to transfer a call from the first telecommunication device to the second telecommunication device, when the first wireless link or a second radio link between the first telecommunication device and the second telecommunication device is broken or becomes sufficiently weak. The invention also relates to a method and a headset to be used with such a system.

13 Claims, 5 Drawing Sheets

Related U.S. Application Data continuation-in-part of application No. PCT/EP2012/076768, filed on Dec. 21, 2012.

(51) Int. Cl.
*H04W 24/04* (2009.01)
*H04W 76/02* (2009.01)

(56) References Cited

U.S. PATENT DOCUMENTS

| | | |
|---|---|---|
| 8,600,030 B2 | 12/2013 | Kannappan et al. |
| 2002/0198020 A1 | 12/2002 | Mooney |
| 2003/0036386 A1 | 2/2003 | Harrison |
| 2006/0089175 A1* | 4/2006 | Yun .................... H04M 1/6066 455/567 |
| 2006/0183425 A1 | 8/2006 | Seshadri et al. |
| 2007/0004473 A1* | 1/2007 | Clark .................. H04M 1/2535 455/575.2 |
| 2008/0085746 A1 | 4/2008 | Ray et al. |
| 2008/0261524 A1 | 10/2008 | Grushkevich |
| 2009/0170521 A1* | 7/2009 | Dubs ................... H04M 1/7253 455/442 |
| 2010/0159830 A1 | 6/2010 | Findlay |
| 2010/0291928 A1 | 11/2010 | Valdez |
| 2011/0207447 A1 | 8/2011 | Bhow |
| 2011/0294423 A1 | 12/2011 | Lin |
| 2013/0309996 A1 | 11/2013 | Siegel et al. |
| 2013/0310049 A1 | 11/2013 | Siegel |
| 2014/0155033 A1 | 6/2014 | Lazaridus et al. |

* cited by examiner

WIRELESS HEADSET AND A HEADSET SYSTEM FOR TRANSFERRING CALL BETWEEN TWO TELECOMMUNICATION DEVICES

TECHNICAL FIELD

The invention relates to a wireless headset system comprising
a first telecommunication device,
a second telecommunication device, such as a mobile phone or a smart phone,
a wireless headset adapted to be wirelessly connected by a first radio link to the first telecommunication device.
The invention also relates to a headset to be used in such a system.

BACKGROUND ART

Today, many people all over the world use several different telecommunication devices such as PSTN desktop phones, IP desktop phones, PC softphones and mobile phones etc. Especially mobile phones and IP telephony (IP desk phones and PC softphones) have become popular the recent years. Mobile phones are advantageous as the user can move around while having a conversation with other call participants. PSTN and IP telephony is advantageous as it often provides telephony at low rates and good audio quality. When a user is in a call on the PSTN or IP telephone and must leave his desk, maybe for driving home or to a meeting, he must end the call, and continue it on the mobile phone. This is cumbersome and time consuming. He may be able to transfer the call, but this requires manual interaction. In addition, the situation, where a user is arriving at his desk while having a phone call on his mobile phone, he may wish to transfer the call to the PSTN or IP desk phone or PC softphone, which also requires manual interaction.

US 2011/0207447 (Plantronics Inc) discloses a headset system according to the preamble, which system makes it possible for a user to seamlessly transfer a call from a first telecommunication device to a second telecommunication device by entering a call transition mode of the headset.

DISCLOSURE OF INVENTION

The object of the invention is to provide a headset system with an improved way of transferring telephone calls from a first telecommunication device to a second telecommunication device. The headset system according to the invention is characterized in that it is adapted to transfer a call from the first telecommunication device to the second telecommunication device, when the first wireless link or a second radio link between the first telecommunication device and the second telecommunication device is broken or becomes sufficiently weak. For example: if a user is using the wireless headset for a telephone call on a PC softphone as the first telecommunication device and leaves the desk, the first radio link will become weaker with the distance between the headset and the PC. When the signal strength of the link falls below a predetermined threshold, and/or for a predetermined period of time, so that a short interruption may not cause a disconnect, the PC softphone automatically transfers the call to the second telecommunication device, which may be a mobile phone in the user's pocket. Then the user may continue the conversation on the second telecommunication device. Alternatively, a second radio link between the first and second telecommunication devices may be utilized for initiating the call transfer. For example: certain loss in the radio link quality between the PC and the mobile phone may initiate a call transfer from the PC softphone to the mobile phone.

The headset system may also be adapted to transfer a call from the second telecommunication device to the first telecommunication device, when the first wireless link or a second radio link between the first telecommunication device and the second telecommunication device is established or obtains a predetermined strength. Thus, a user may approach his desk while having a call on his mobile phone using a Bluetooth headset and when the link between the mobile phone and the PC is established and sufficiently strong, the call may be transferred from the mobile phone to the PC. Alternatively, the call may be transferred when a Bluetooth link between the mobile phone and the PC is established and has obtained a predetermined strength. The signal strength may be based on RSSI (received signal strength indication) or BER (bit error rate). It may, of course, be desirable to choose a relatively high-predetermined strength, so that the call transfer will not take place before the user is actually arrived at his desk.

According to a preferred embodiment, a third radio link is established between the headset and the second telecommunication device when a call is transferred from the first telecommunication device to the second telecommunication device. Thus, the user may continue the conversation via the headset.

The first telecommunication device may comprise a personal computer, such as a desktop computer, a laptop computer or a tablet computer, on which a softphone is installed.

A softphone plug-in for performing a call transfer to a pre-programmed number of the second telecommunication device may be installed on the personal computer, eventually using a software API (application programming interface) on the personal computer.

According to an embodiment of the headset system, the first telecommunication device may comprise a headset base with a transceiver for establishing the first radio link. Thus, the first telecommunication device may comprise a personal computer and a headset base, which may be interconnected by a cable. The transceivers of the headset and the headset base may be DECT transceivers.

The headset base may be adapted to automatically initiate a call transfer from the first telecommunication device to the second telecommunication device when the first radio link is broken or becomes sufficiently weak.

The headset base may be adapted to automatically initiate a call transfer from the second telecommunication device to the first telecommunication device, when the when the first link is established and has a predetermined strength.

Alternatively, the headset base may be adapted to establish a second radio link between the headset base and the second telecommunication device and automatically initiate a call transfer from the first telecommunication device to the second telecommunication device, when the second radio link is broken or becomes sufficiently weak, i.e. falls below a predetermined level, such as zero.

The headset base may be adapted to automatically initiate a call transfer from the second telecommunication device to the first telecommunication device, when the second radio link is established and has a predetermined strength.

The headset base may be adapted to automatically initiate a call transfer from the second telecommunication device to the first telecommunication device, when the first radio link is established and has a predetermined strength.

The headset itself may be adapted to perform a call transfer from the second telecommunication device to the first telecommunication device, when the first wireless link is established or obtains a predetermined strength. Thus, the necessary software for terminating a call with a call participant on the second telecommunication device and connect a call with the call participant on the first telecommunication device, is provided in the headset memory.

The first radio link may be established, when a call is transferred from the second telecommunication device to the first telecommunication device.

The invention also relates to a wireless headset adapted to be paired and wirelessly connected with both a first telecommunication device and a second telecommunication device, wherein the headset may be adapted to, during an active call on the second telecommunication device, automatically initiate a call transfer from the second telecommunication device to the first telecommunication device upon establishment of a wireless link of a predetermined strength between the headset and the first telecommunication device.

BRIEF DESCRIPTION OF THE DRAWINGS

The invention is explained in detail below with reference to the drawing illustrating a preferred embodiment of the invention and in which.

MODES FOR CARRYING OUT THE INVENTION

Figure 1:
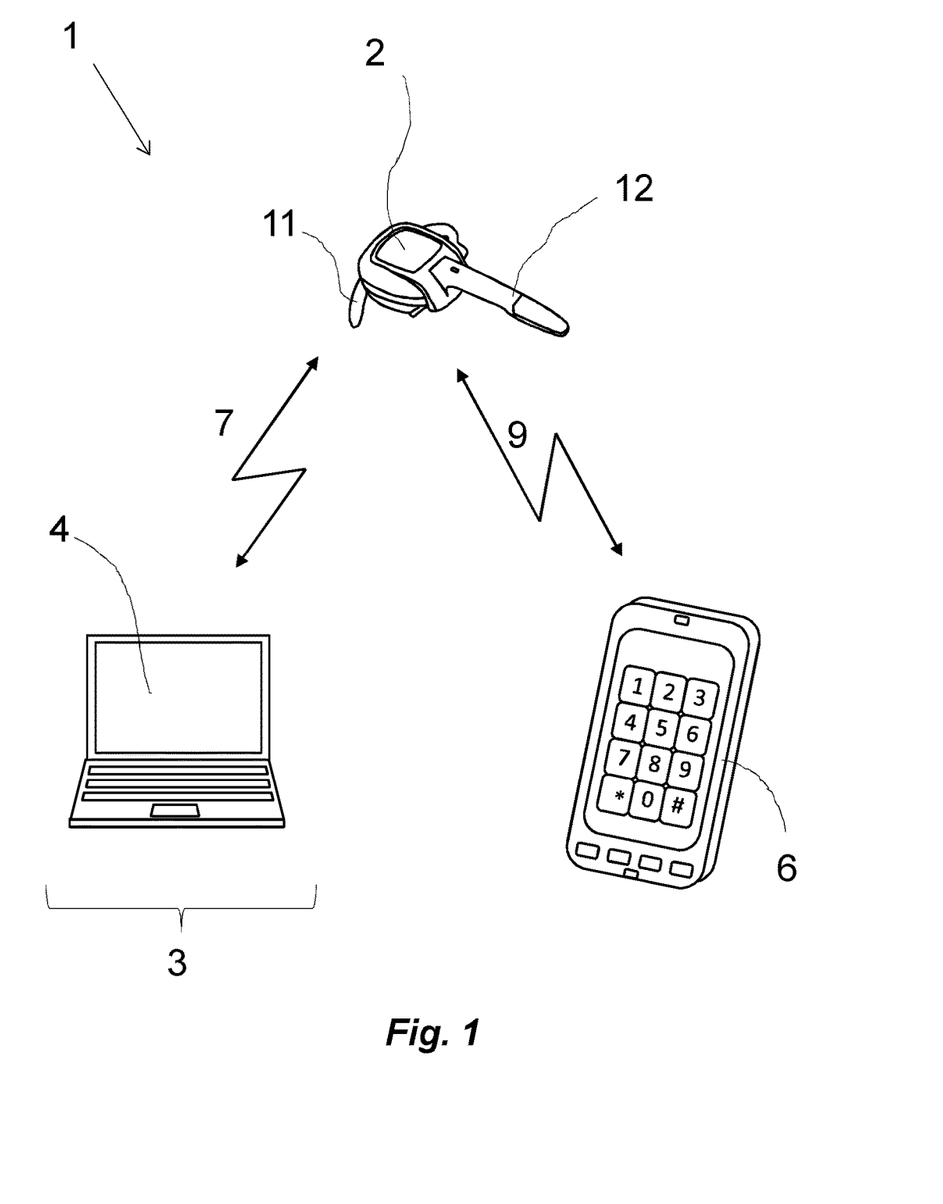
FIG. 1 is a schematic view of a headset system according to the invention.

FIG. 1 is a schematic view of a headset system 1 according to the invention. The headset system 1 comprises a wireless headset 2, a first telecommunication device 3 consisting of a laptop computer 4 and a second telecommunication device consisting of a smart phone 6. The headset 2 is a monaural headset comprising an ear hook 11 and a foldable microphone arm 12. The headset 2 and the laptop computer 4 are wirelessly connected by a Bluetooth link 7. The laptop computer 4 may have a built-in Bluetooth transceiver or a Bluetooth dongle may be inserted to a USB port of the laptop computer 4. The headset 2 and the smart phone 6 are wirelessly connected by a Bluetooth link 9. The headset 2 is a so-called "multiuse" Bluetooth headset, which means that it can be simultaneously connected to at least two devices, in this situation the laptop computer 4 and the smart phone 6. The headset system 1 can be utilized by the following scenarios:

Scenario 1—The user is leaving his desk during a softphone call:

The user is sitting at his desk with the smart phone 6 lying on in his pocket. He makes a call on the softphone (on the laptop computer 4) using his headset 2. During the call, he realizes that he must leave the office for a meeting in another building. He leaves the office while talking. After 10-20 meters walking, the Bluetooth connection 7 between the headset 2 and the laptop computer 4 is broken due to the distance. A software plugin installed on the laptop computer 3 "knows" the number of the smart phone 6 and initiates a call transfer to the smart phone 6 as soon as the Bluetooth link 7 is broken. A voice message, such as "please wait for reconnection" is sent to the other call participant. The headset 2 is connected to the smart phone 6 by the Bluetooth link 9 and is notified about the call transfer. The headset 2 is programmed to recognize the incoming call (the transferred call) from the softphone and automatically accepts the call, whereby the conversation can continue. The headset system 1 according to FIG. 1 is also advantageous although the headset 2 is not connected to the smart phone 6. In this case, the user must continue the call on the smart phone 6 without using the headset 2. In this case, the smart phone 6 may be programmed to automatically accept the incoming call (the transferred call) from the softphone or the user may manually accept the call, as he does when there is a normal incoming call on the smart phone 6.

Scenario 2—The user is arriving at his desk during a mobile call:

The user is driving his car back to the job from a meeting with his smart phone 6 in his pocket and the headset 2 on his ear. While driving he accepts an incoming call on the smart phone by pushing a button on the headset 2. He arrives at his work while talking to the call participant. He enters the office building and approaches his desk. When about 10-20 meters from the desk, the Bluetooth link 7 between the headset 2 and the laptop computer 4 is automatically established. When the link strength has obtained a predetermined level (the user is close to his desk), the headset 2 automatically transfers the call to the softphone using the Bluetooth hands free profile. The softphone plugin recognises the smart phone number and automatically accepts the incoming call (the transferred call), whereby the smart phone call terminates and the softphone call is started.

Figure 2:
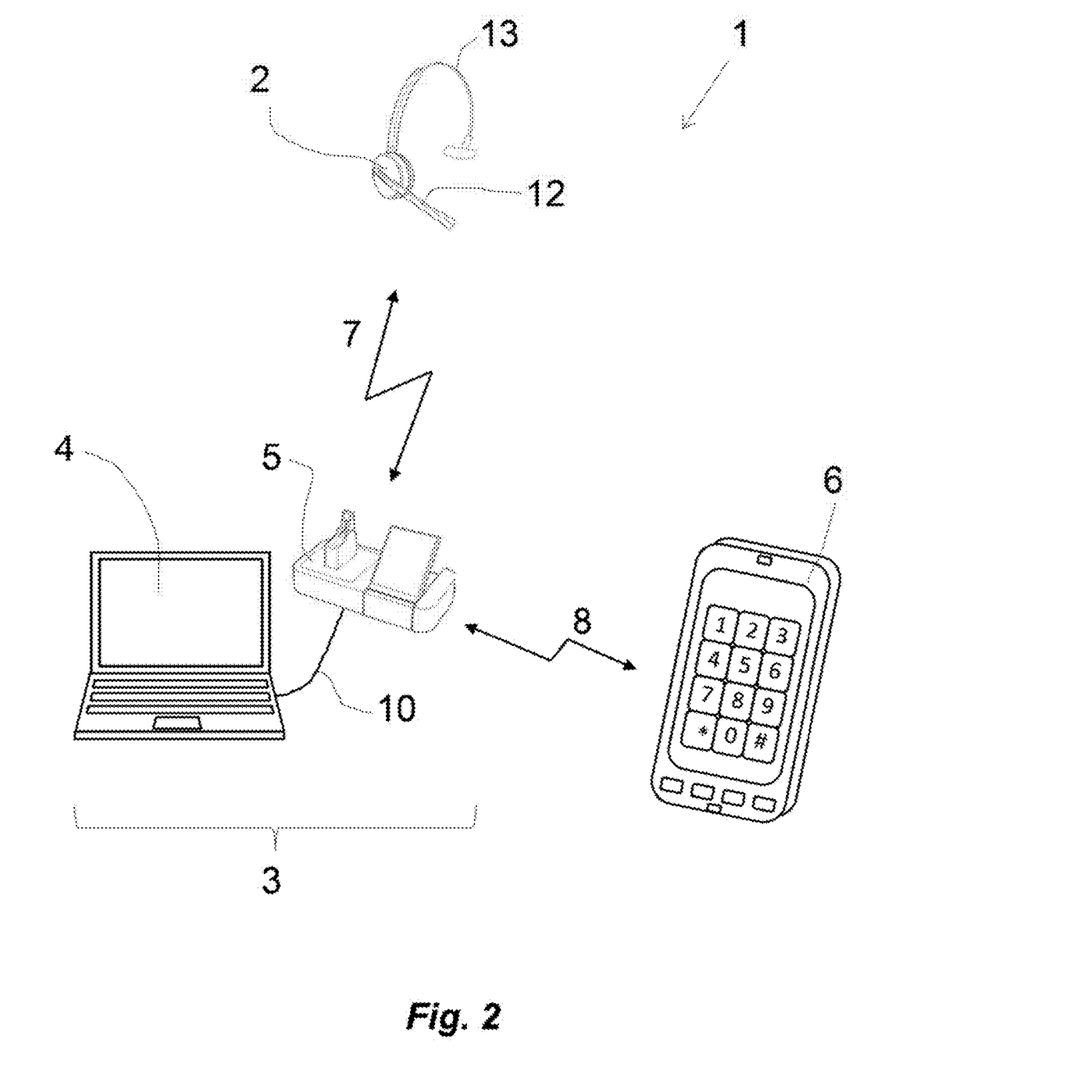
FIG. 2 is a schematic view of a second embodiment of a headset system according to the invention, FIG. 3 discloses a schematic view of a third embodiment of a headset system according to the invention.

The system 1 shown in FIG. 1 may also allow the user to manually activating a call transfer. FIG. 2 discloses another embodiment of a headset system 1 according to the invention. Here, the first telecommunication device 3 comprises a laptop computer 4 and a headset base 5. The headset 2 is provided with e headband 13. The headset base 5 and the headset 2 are connected by a DECT (Digital European Cordless Telecommunications) link 7. The headset base 5 also has a Bluetooth transceiver and is connected to the smart phone 6 via a Bluetooth link 8.

Scenario 3: —The user is leaving his desk during a softphone call:

The user is sitting at his desk with the smart phone 6 lying in his pocket. He makes a call on the softphone (on the laptop computer 4) using his headset 2. During the call, he realizes that he must leave the office for a meeting in another building. He leaves the office while talking. After 10-20 meters walking, the Bluetooth connection 8 between the headset base 5 and the smart phone 6 is broken due to the distance. A software plugin installed on the laptop computer 3 "knows" the number of the smart phone 6 and initiates a call transfer to the smart phone 6 as soon the Bluetooth link 8 is broken. A voice message, such as "please wait for reconnection" is sent to the other call participant. The headset 2 notifies the user with a voice message, such as "Please continue call with smart phone". The user accepts the incoming call (the transferred call), whereby the conversation can continue. The smartphone 6 may be set to automatically accept the call, in case it is a call transfer from the softphone. Instead of the Bluetooth link 8 between the headset base 5 and the smart phone 6, the DECT link 7 may be utilized for call transferring. Thus, the call may be transferred from the softphone to the smart phone 6 when the DECT link 7 breaks or becomes sufficiently weak, and a call may be transferred from the smart phone 6 to the softphone, when the DECT link 7 is established and is of a predetermined strength. In this case, the Bluetooth link 8 between the headset base 5 and the smart phone 6 may be omitted.

Scenario 4—The user is arriving at his desk during a mobile call:

The user is walking from a meeting room towards his desk, when he accepts an incoming call on his smart phone 6. When about 10-20 meters from the desk, the Bluetooth link 8 between the smart phone 6 and the headset base 5 is automatically established. When the link is of a predetermined strength, the headset base 5 automatically transfers the call to the softphone using the Bluetooth hands free profile. The softphone plugin recognises the smart phone number and automatically accepts the incoming call (the transferred call), whereby the smart phone call terminates and the softphone call is started.

The system 1 shown in FIG. 2 may also allow the user to manually activating a call transfer.

Figure 3:
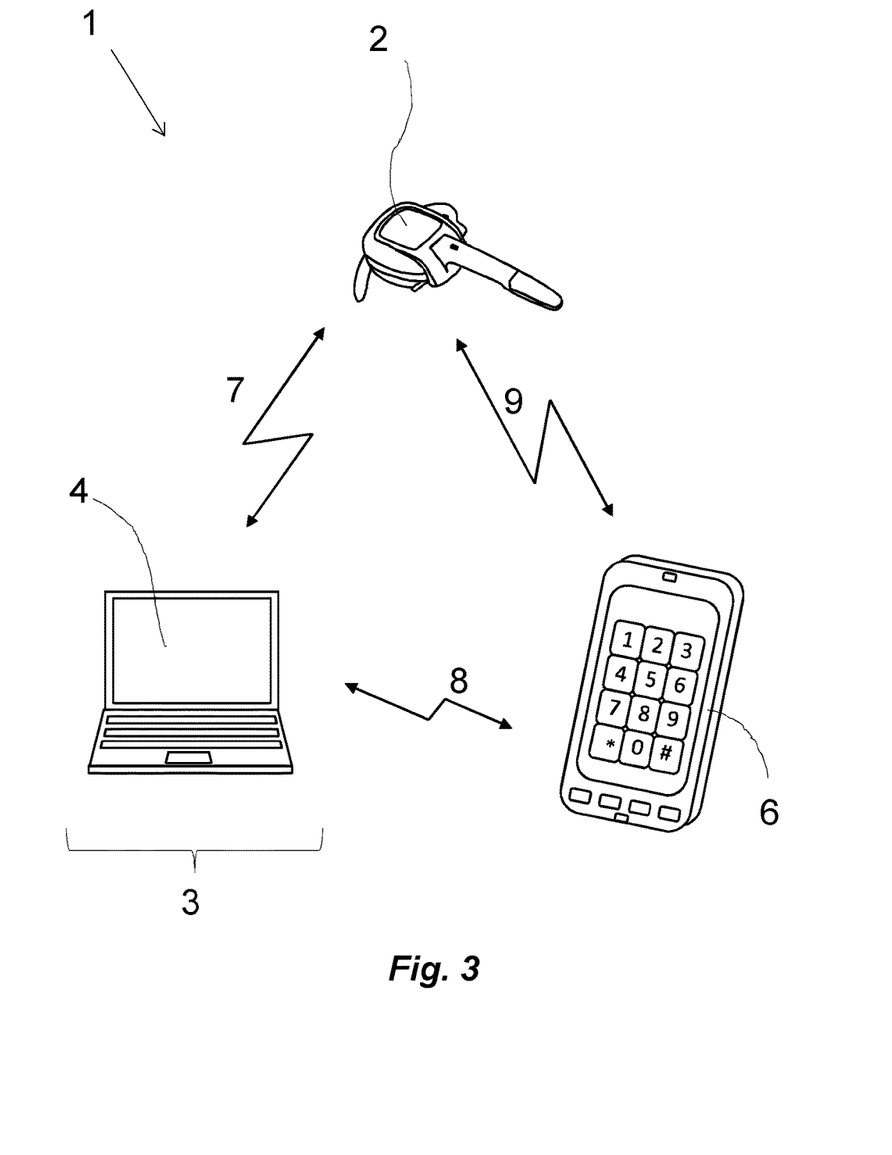

FIG. 3 is a third embodiment of a headset system 1 according to the invention. This embodiment is a kind of a mixture between the embodiments shown in FIGS. 1 and 2. Here, the establishment or break of a Bluetooth link 8 between the smart phone 6 and the laptop computer 4 is used for initiating a call transfer. The Bluetooth headset 2 is paired with both the laptop computer 4 and the smart phone 6.

The system 1 shown in FIG. 3 may also allow the user to manually activating a call transfer.

Figure 4:
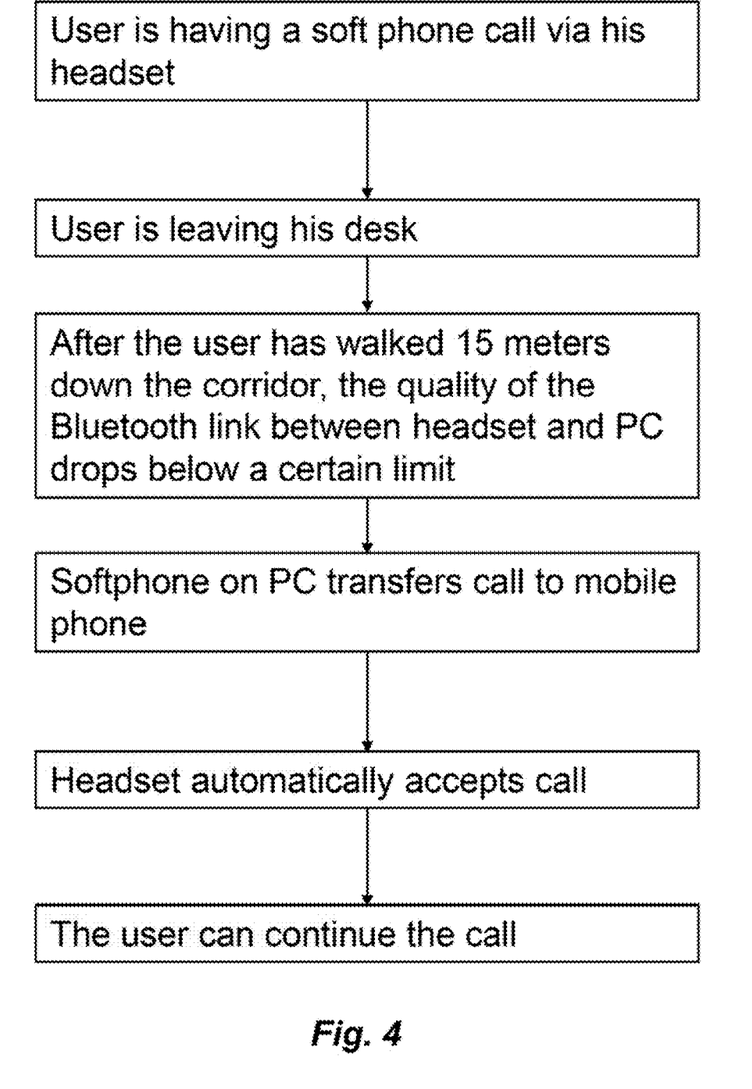
FIG. 4 is a flow chart showing the use of a headset system according to the invention.

FIG. 4 is a block diagram showing the use of the headset system 1 shown in FIG. 1.

Figure 5:
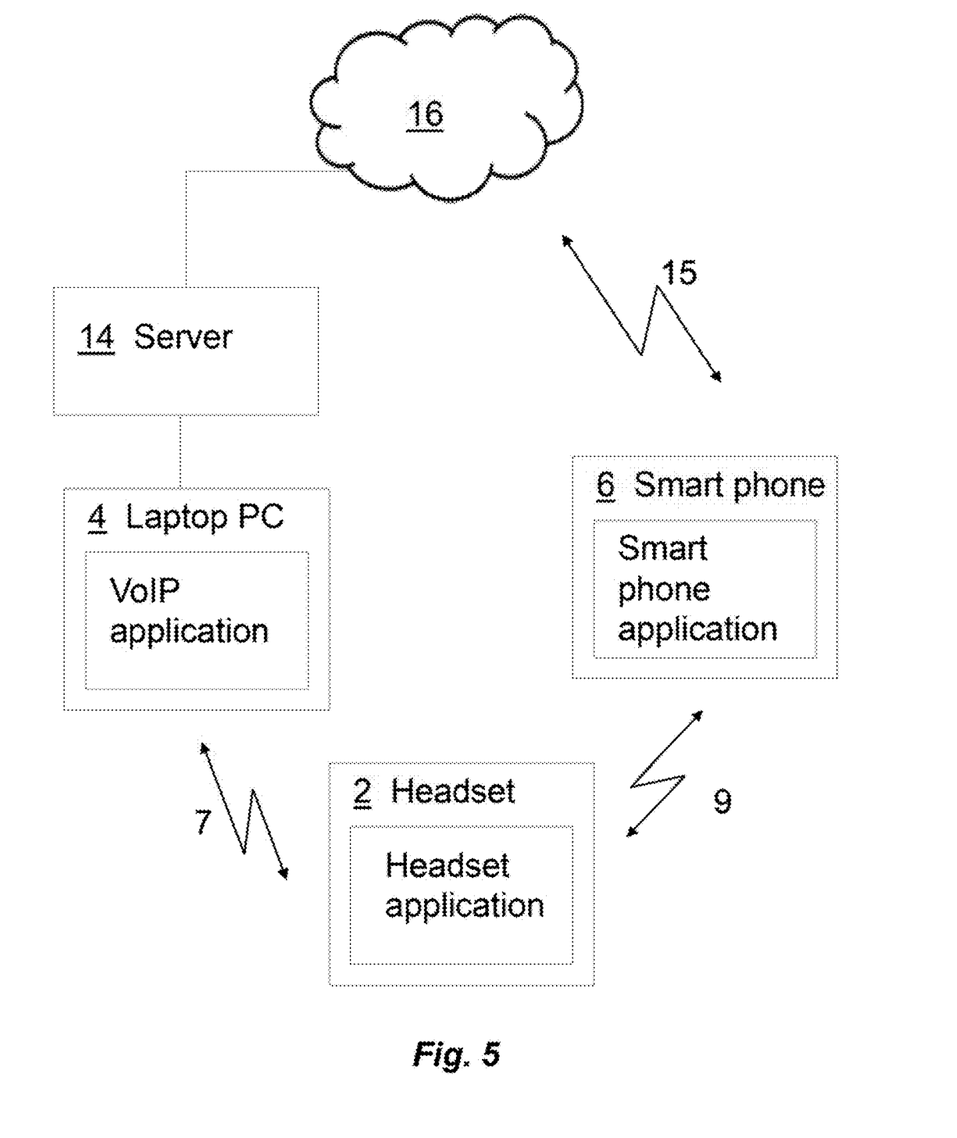
FIG. 5 is a diagram showing a headset system according to the invention.

FIG. 5 is a more schematic view of the headset system 1 according to the first embodiment of the invention. The laptop PC 4 is connected to a server 14. The server 14 could be installed in the same company as the laptop PC or anywhere outside. The server 14 connects the PC 4 with the cloud 16, which includes the Internet, PSTN (Public Switched Telephone Network) and the mobile telephone network. A VoiP application such a Skype® or Microsoft Lync® is installed on the laptop PC. On the laptop PC is also installed a softphone plugin forcing the VoIP application or the server 14 to transfer a call on the softphone to the smartphone 6, when the Bluetooth link 7 is becoming weak or breaks. Software on the smart phone 6 and/or the headset 2 recognises the transferred call and automatically accepts it. Audio messages or simple sounds may inform the headset user that the call is transfer and will continue in a few seconds. If there is call on the smart phone 6 and the Bluetooth link 7 is established, the headset application may instruct the smart phone 6 to transfer the call to the soft phone on the laptop PC 4. Optionally, the call may be returned to an earlier linked device when the early link is sufficiently restored (i.e. above a predetermined level). This restoration can be automatic, or more preferably, with the consent of the user, by pressing a key in response to a screen prompt to restore, or by similar audible signal.

Only exemplary embodiments are shown here. Many other headset system embodiments may be contemplated. For example: the laptop could be replaced by a PSTN desk phone, IP Desk phone, desktop computer, tablet computer, smart phone or mobile phone.

Also, the smart phone 6 could be replaced by other portable telecommunication devices, such as a normal mobile phone.

Also disclosed is a wireless headset system comprising:
a first telecommunication device,
a second telecommunication device, such as a mobile phone or a smart phone,
a wireless headset adapted to be wirelessly connected by a first radio link to the first telecommunication device, wherein
the headset system is adapted to transfer a call from the first telecommunication device to the second telecommunication device, when the first wireless link or a second radio link between the first telecommunication device and the second telecommunication device when the link to the second telecommunications device is sufficiently strong to sustain said link. In other words, the disclosure includes the possibility of monitoring the signal strength and switching on a low signal to device 2, or on a high signal to device 1 from device 2, the device numbers being interchangeable.

Also disclosed is a method. For example: a method of transferring telecommunications links for a wireless headset system having
a first telecommunication device,
a second telecommunication device, such as a mobile phone or a smart phone,
a wireless headset adapted to be wirelessly connected by a first radio link to the first telecommunication device, comprising the steps of
connecting a call between to a first telecommunications device and a headset, monitoring the connection link between the first device and the headset;
in case said link weakens to a predetermined level
transferring a transfer a call from the first telecommunication device to the second telecommunication device.

Also disclosed is a method including monitoring the connection link between the first device and the headset; in case said link weakens for a predetermined period of time below a predetermined signal strength level, transferring a transfer a call from the first telecommunication device to the second telecommunication device.

Also disclosed is a method including monitoring the connection link between the first device and the headset; in case said link strengthens to a predetermined level transferring a transfer a call from the second telecommunication device to the first telecommunication device.

REFERENCE SIGNS

1 headset system
2 headset
3 first telecommunication device
4 laptop computer
5 headset base
6 smart phone
7 first radio link (Bluetooth or DECT)
8 second radio link (Bluetooth)
9 third radio link (Bluetooth)
10 cable
11 ear hook
12 microphone arm
13 headband
14 server
15 GSM link
16 Internet/PSTN/Cellular Network

The invention claimed is:

1. A wireless headset system comprising a first telecommunication device, a second telecommunication device, a wireless headset adapted to be connected by a first link to the first telecommunication device and, and at least for a period of time is simultaneously connected to the second telecommunications device by a second wireless link, wherein the headset is adapted to automatically transfer a call from the first telecommunication device to the second telecommunication device, when the first link is monitored and falls below a predetermined link strength and wherein the second telecommunications device is configured to automatically accept the call; so that the call continues with the second wireless link to the second telecommunications device without user intervention.

2. A wireless headset system according to claim 1, wherein the first telecommunication device comprises a personal computer, on which a softphone is installed.

3. A wireless headset system according to claim 2, wherein a softphone plug-in for performing a call transfer to a pre-programmed number of the second telecommunication device is installed on the personal computer, using a software API on the personal computer.

4. A wireless headset system according to claim 1, wherein the first telecommunication device comprises a headset base with a transceiver for establishing the first wireless link.

5. A wireless headset system according to claim 4, wherein the headset base is adapted to automatically initiate a call transfer from the first telecommunication device to the second telecommunication device when the first wireless link is broken or has become sufficiently weak.

6. A wireless headset system according to claim 5, wherein the headset base is adapted to automatically initiate the call transfer from the second telecommunication device back to the first telecommunication device, when the when the first link is established and reaches a predetermined link strength.

7. A wireless headset system comprising a first telecommunication device, a second telecommunication device, a wireless headset adapted to be connected by a first link to the first telecommunication device and, and at least for a period of time is simultaneously connected to the second telecommunications device by a second wireless link, wherein the headset is adapted to automatically transfer a call from the first telecommunication device to the second telecommunication device, when the first link is monitored and falls below a predetermined link strength and wherein the second telecommunications device is configured to automatically accept the call; so that the call continues with the second wireless link to the second telecommunications device without user intervention, wherein a headset base is adapted to establish a third wireless direct link between the second telecommunication device and said headset base and to automatically initiate the call transfer from the first telecommunication device to the second telecommunication device, when the second wireless link becomes sufficiently weak.

8. A wireless headset system according to claim 7, wherein the headset base is adapted to automatically initiate a call transfer back from the second telecommunication device to the first telecommunication device, when the first link is established and has a predetermined strength.

9. A method of transferring telecommunications links for a wireless headset system having
 a first telecommunication device,
 a second telecommunication device,
 a wireless headset adapted to be wirelessly connected by a first wireless link to the first telecommunication device,
comprising the steps of:
 connecting a call between the first telecommunications device and the headset;
 at least for a period of time, simultaneously connecting the headset to the first and second communications devices;
 monitoring the connection of the first wireless link between the first device and the headset;
 in case said first wireless link weakens to a predetermined level;
 transferring the call from the first telecommunication device to the second telecommunication device;
 automatically accepting the call on the second telecommunication device;
 so that the call continues the second telecommunications device, on a second wireless link, without user intervention.

10. The method of claim 9 including monitoring the connection link between the first device and the headset;
 in case said first wireless link weakens for a predetermined period of time below a predetermined signal strength level, transferring the call from the first telecommunication device to the second telecommunication device.

11. The method of claim 9 including monitoring the connection link between the first device and the headset;
 in case said first wireless link between the first device and the headset strengthens to a predetermined level;
 transferring the call from the second telecommunication back device the first telecommunication device.

12. The wireless headset system of claim 1 wherein the headset itself includes software capable of terminating the call on the first telecommunications device and connecting the call with the second telecommunications device, and wherein the headset includes memory and a processor for executing said software.

13. The wireless headset system of claim 1 wherein the headset includes software capable of simultaneously pairing of first and second telecommunications devices and automatically initiate the call transfer from the second telecommunications device to the first telecommunications device based on establishment of the first wireless link of predetermined strength between the headset and first telecommunications device.

* * * * *